United States Patent
Thimirachandra

(10) Patent No.: US 12,229,997 B2
(45) Date of Patent: Feb. 18, 2025

(54) SYSTEM AND METHOD FOR DETECTING CALIBRATION OF A 3D SENSOR

(71) Applicant: ZEBRA TECHNOLOGIES CORPORATION, Lincolnshire, IL (US)

(72) Inventor: Sanjeewa Thimirachandra, Kotugoda (LK)

(73) Assignee: Zebra Technologies Corporation, Lincolnshire, IL (US)

( * ) Notice: Subject to any disclaimer, the term of this patent is extended or adjusted under 35 U.S.C. 154(b) by 541 days.

(21) Appl. No.: 17/499,761

(22) Filed: Oct. 12, 2021

(65) Prior Publication Data
US 2023/0112666 A1    Apr. 13, 2023

(51) Int. Cl.
*G06K 9/00*    (2022.01)
*G06T 7/11*    (2017.01)
(Continued)

(52) U.S. Cl.
CPC ............... *G06T 7/85* (2017.01); *G06T 7/11* (2017.01); *G06T 7/73* (2017.01); *G06T 7/62* (2017.01);
(Continued)

(58) Field of Classification Search
CPC . G06T 2207/10012; G06T 7/593; G06T 7/11; G06T 7/73; G06T 7/62; G06T 2207/10028;
(Continued)

(56) References Cited

U.S. PATENT DOCUMENTS

| | | | | |
|---|---|---|---|---|
| 9,602,806 B1 * | 3/2017 | Stafford | ............... | H04N 13/243 |
| 2014/0184751 A1 * | 7/2014 | Liou | ..................... | H04N 13/246 |
| | | | | 348/47 |

(Continued)

FOREIGN PATENT DOCUMENTS

WO    20190221994 A1    11/2019

OTHER PUBLICATIONS

Novelty Search Report for Belgian Patent Application No. 202205819 mailed on Jun. 28, 2023.
(Continued)

*Primary Examiner* — Gregory A Morse
*Assistant Examiner* — Kevin M Coomber

(57) ABSTRACT

An example computing device includes: a three-dimensional (3D) sensor configured to capture point cloud data from a field of view; an auxiliary sensor configured to capture a reference depth measurement corresponding to a surface within the field of view; a processor interconnected with the 3D sensor and the auxiliary sensor, the processor configured to: control the 3D sensor and the auxiliary sensor to capture the point cloud data and the reference depth measurement; select a region of the point could data including a position of the reference depth measurement; determine a representative depth value of the region of the point cloud data to compare to the reference depth measurement; determine whether the representative depth value is within a similarity threshold to the reference depth measurement; and determine, based on whether the representative depth value is within the similarity threshold to the reference depth measurement, whether to use the point cloud data for a dimensioning operation.

24 Claims, 7 Drawing Sheets

(51) Int. Cl.
*G06T 7/73* (2017.01)
*G06T 7/80* (2017.01)
*G06T 7/62* (2017.01)

(52) U.S. Cl.
CPC .............. *G06T 2207/10012* (2013.01); *G06T 2207/10028* (2013.01)

(58) Field of Classification Search
CPC ..... G06T 7/85; G06T 7/62; H04N 2013/0074; H04N 13/243; H04N 2013/0081; H04N 13/246; G06V 20/64; G01B 21/042
See application file for complete search history.

(56) References Cited

U.S. PATENT DOCUMENTS

| | | | |
|---|---|---|---|
| 2018/0045505 A1* | 2/2018 | Thimirachandra | G01S 17/42 |
| 2019/0087635 A1* | 3/2019 | Klaus | G06V 20/64 |
| 2019/0333267 A1 | 10/2019 | Black et al. | |
| 2019/0355144 A1* | 11/2019 | Korobov | G06T 7/50 |
| 2020/0020133 A1* | 1/2020 | Najaf-Zadeh | G06T 9/00 |
| 2020/0074684 A1* | 3/2020 | Lin | H04N 13/204 |
| 2021/0264364 A1 | 8/2021 | Kankaria et al. | |
| 2021/0312663 A1 | 10/2021 | Zolotov et al. | |

OTHER PUBLICATIONS

International Search Report and Written Opinion for International Patent Application No. PCT/US2022/45881 mailed on Feb. 9, 2023.
Chen et al., "Calibrate Multiple Consumer RGB-D Cameras for Low-Cost and Efficient 3D Indoor Mapping" (Feb. 22, 2018) [online], [retrieved on Jan. 3, 2023]. Retrieved from the Internet <URL: https://www.mdpi.com/2072-4292/10/328>, entire document.

* cited by examiner

SYSTEM AND METHOD FOR DETECTING CALIBRATION OF A 3D SENSOR

BACKGROUND

Stereo imaging assemblies and/or other three-dimensional sensors can be employed, e.g. on mobile computing devices, to dimension objects such as packages, produce three-dimensional representations of scenes and the like. Such three-dimensional sensors may be susceptible to losing calibration over time due to environmental conditions, physical damage and the like, resulting in reduced accuracy for dimensioning objects and the like.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
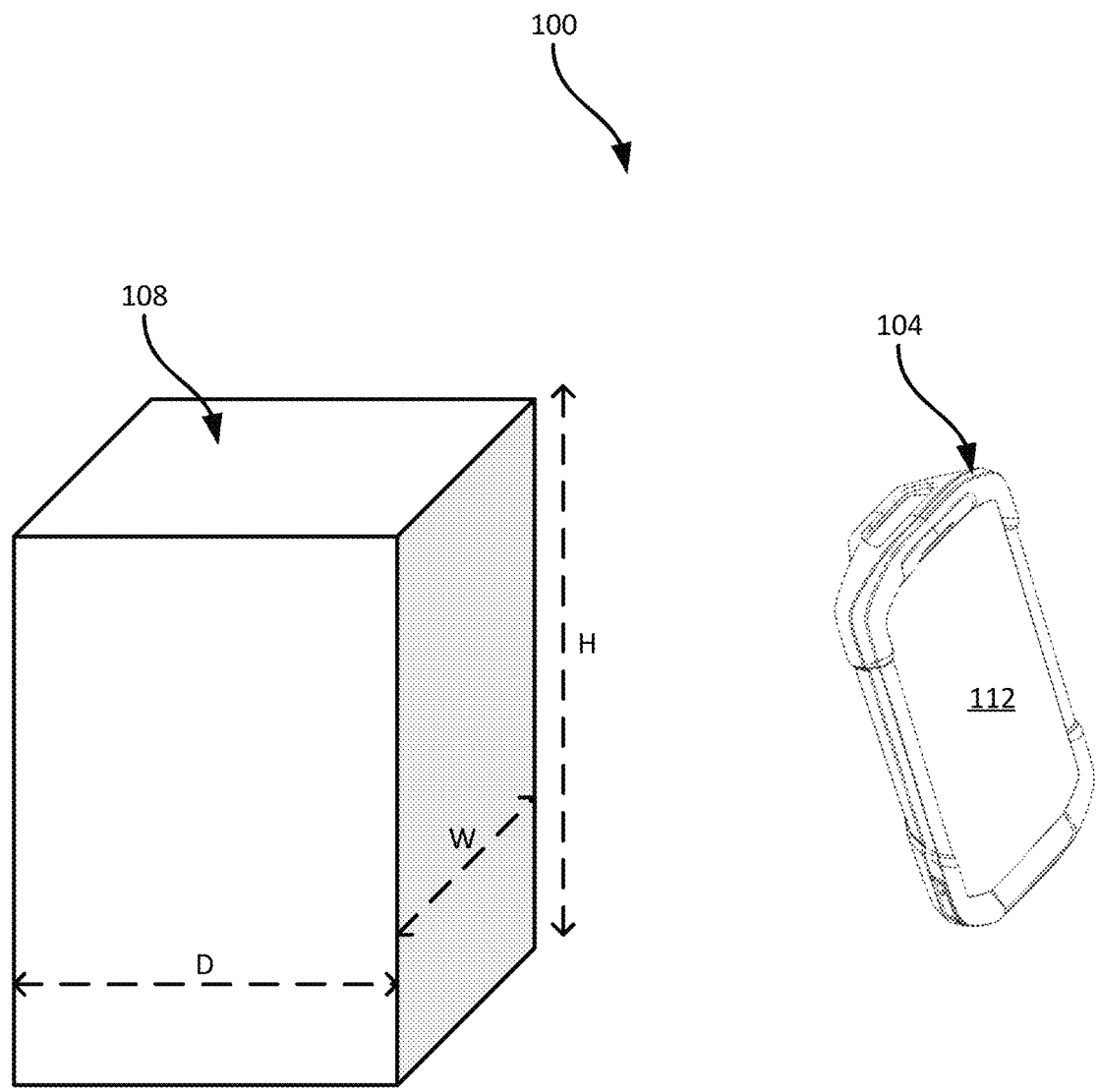
FIG. 1 is a schematic diagram illustrating a system for detecting calibration of a 3D sensor of a mobile computing device.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a computing device comprising: a three-dimensional (3D) sensor configured to capture point cloud data from a field of view; an auxiliary sensor configured to capture a reference depth measurement corresponding to a surface within the field of view; a processor interconnected with the 3D sensor and the auxiliary sensor, the processor configured to: control the 3D sensor and the auxiliary sensor to capture the point cloud data and the reference depth measurement, respectively; select a region of the point could data including a position of the reference depth measurement; determine a representative depth value of the region of the point cloud data to compare to the reference depth measurement; determine whether the representative depth value is within a similarity threshold to the reference depth measurement; and determine, based on whether the representative depth value is within the similarity threshold to the reference depth measurement, whether to use the point cloud data for a dimensioning operation.

Additional examples disclosed herein are directed to a method comprising: controlling a 3D sensor and an auxiliary sensor to capture point cloud data and a reference depth measurement, respectively; selecting a region of the point could data including a position of the reference depth measurement; determining a representative depth value of the region of the point cloud data to compare to the reference depth measurement; determining whether the representative depth value is within a similarity threshold to the reference depth measurement; and determining, based on whether the representative depth value is within the similarity threshold to the reference depth measurement, whether to use the point cloud data for a dimensioning operation.

Additional examples disclosed herein are directed to a non-transitory computer-readable medium storing a plurality of computer-readable instructions executable by a processor, wherein execution of the instructions configures the processor to: control a 3D sensor and an auxiliary sensor to capture point cloud data and a reference depth measurement, respectively; select a region of the point could data including a position of the reference depth measurement; determine a representative depth value of the region of the point cloud data to compare to the reference depth measurement; determine whether the representative depth value is within a similarity threshold to the reference depth measurement; and determine, based on whether the representative depth value is within the similarity threshold to the reference depth measurement, whether to use the point cloud data for a dimensioning operation.

FIG. 1 depicts a system 100 for detecting whether a 3D sensor of a mobile computing device is out of calibration in accordance with the teachings of this disclosure. The system 100 includes a computing device 104 (also referred to herein as simply the device 104) that is enabled to capture point cloud data using a three-dimensional (3D) sensor, such as a stereo camera assembly, time-of-flight (Tof) camera, lidar sensor, or the like. The point cloud data can be employed for a wide variety of purposes, including generation of three-dimensional representations of scenes and/or detection of objects within such scenes. The point cloud data, in the present example, enables the device 104 to detect objects such as an object 108 illustrated in FIG. 1. The device 104 may be a mobile computing device, such as a handheld dimensioning device, or the like, or the device 104 may be fixed to allow the sensors to consistently capture data with the same frame of view. The object 108 can be a package or collection of packages (e.g. on a pallet) in a transport and logistics facility, for example.

The device 104 may then determine characteristics of the object 108, such as dimensions including a height "H", a width "W" and a depth "D" of the object 108. The dimensions generated by the device 104 can be employed to generate a bounding box encompassing the object 108, for use by other computing devices associated with the device 104 (e.g. to optimize the use of space in a container used to ship the object 108, to determine a shipping cost for the object 108, and the like). The device 104 can present the dimensions, as well as a variety of other information, on a display 112.

Figure 2:
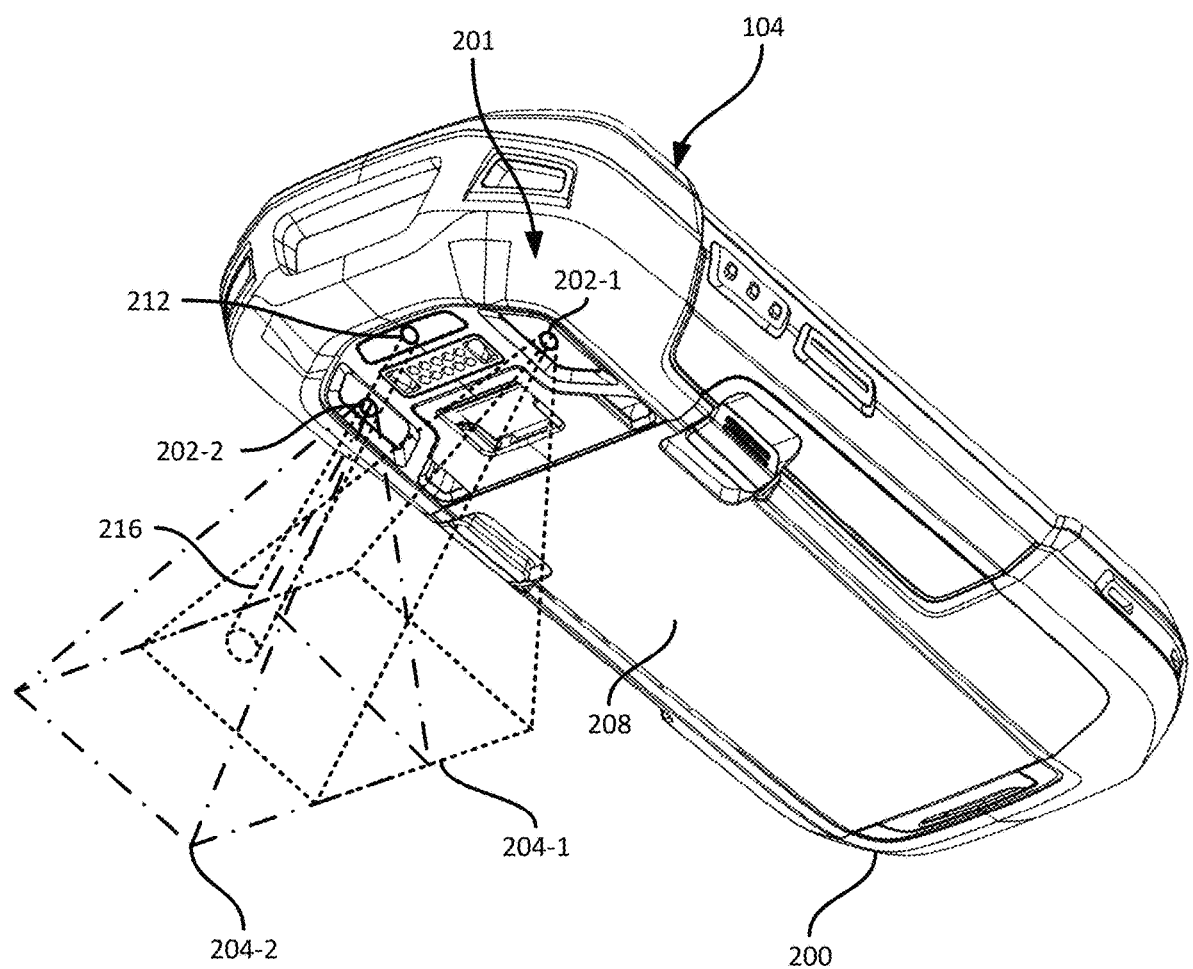
FIG. 2 is a diagram illustrating a rear view of the mobile computing device of FIG. 1.

Turning to FIG. 2, the device 104 is shown from the rear (opposite the side bearing the display 112). As shown in FIG. 2, the device 104 includes a housing 200 supporting the various components of the device 104. Among the components supported by the housing 200 are the display 112 shown in FIG. 1, which may include an integrated touch screen. The device 104 can also include other input and/or output components, in addition to or instead of the display 112 and touch screen mentioned above. Examples of such components include speakers, microphones, keypads, and the like.

In the present example, the 3D sensor of the device 104 is implemented as a stereo camera assembly 201 having a first camera 202-1 and a second camera 202-2, spaced apart from each other on the housing 200 of the device 104. The cameras 202 each include a suitable image sensor or combination of image sensors, optical components (e.g. lenses) and the like. The cameras 202 have respective fields of view (FOV) 204-1 and 204-2 extending away from a back surface 208 of the device 104. The FOVs 204, in the illustrated example, are substantially perpendicular to the back surface 208.

The FOVs 204 overlap, as illustrated in FIG. 2, enabling the device 104 to capture point cloud data for objects within the FOVs 204 and determine information such as the dimensions mentioned earlier for such objects. The degree of overlap shown in FIG. 2 is purely for illustrative purposes. In other examples, the FOVs 204 may overlap to a greater or smaller degree than illustrated. The FOVs 204 may be referred to together as a field of view 204 of the stereo camera assembly 201, although it will be understood that such a field of view results from the combination of the two FOVs 204.

The device 104 may also include an additional camera or other image sensor to capture images. In some examples, the cameras 202 may also be controllable independently to capture two-dimensional images that need not be processed to yield point cloud data.

The point cloud data captured by the stereo camera assembly 201 of the device 104 may suffer from reduced accuracy over time, for example due to shifting of optical components or the like. Environmental factors such as impacts from drops, extreme temperatures, and the like may cause of accelerate such degraded performance. In order to maintain or restore accurate generation of point cloud data, the device 104 may be configured to run a recalibration procedure to recalibrate the stereo camera assembly 201 when it detects that the stereo camera assembly 201 is out of calibration. The device 104 may include accelerometers, temperature sensors, and other sensors to detect trigger events which may cause the stereo camera assembly 201 to lose calibration. However, in some cases, the stereo camera assembly 201 may lose calibration over time or with low impact events (e.g., low impact drops) but which are not extreme enough to identify the event as a major event such as a drop, extreme temperature shift or the like.

Accordingly, in accordance with the present disclosure, the device 104 may run a calibration detection procedure to determine the calibration of the stereo camera assembly 201 on a regular basis and/or during regular use. In particular, to determine the calibration of the stereo camera assembly 201, the device 104 may determine a representative depth value from the stereo camera assembly 201 and compare the representative depth value to a reference depth measurement, or simply a reference depth. The reference depth measurement is obtained independently of the stereo cameras 202 themselves, and is employed to determine when the stereo camera assembly 201 (or other 3D sensor) is out of calibration, and hence whether the point cloud data is to be used for a dimensioning operation or discarded.

To that end, the device 104 also includes an auxiliary sensor 212 on the back surface 208 thereof. The auxiliary sensor 212 enables the device 104 to determine a reference depth between the device 104 itself and a reference surface, such as the floor, an object in the FOVs 204, or the like. As seen in FIG. 2, the auxiliary sensor 212 has a field of view 216 that overlaps with the FOVs 204 of the stereo cameras 202. As a result, the auxiliary sensor 212 can capture a reference depth that corresponds to a surface also visible to the stereo camera assembly 201.

In the present example, the auxiliary sensor is a range finder, such as an infrared or near-infrared laser-based range finder. Various other auxiliary sensors are also contemplated however, including ultrasonic sensors, time-of-flight sensors, and the like. As will be apparent to those skilled in the art, successful determination of the calibration of the stereo camera assembly 201 is dependent on the accuracy of the reference depth. Further, the accuracy of depth measurements captured by the auxiliary sensor 212 may vary based on a number of conditions, including surface characteristics of the reference surface (e.g. color, reflectance and the like), orientation of the auxiliary sensor 212 relative to the surface, and the like.

Before further discussing the functionality implemented by the device 104, certain components of the device 104 will be described, with reference to FIG. 3.

Figure 3:
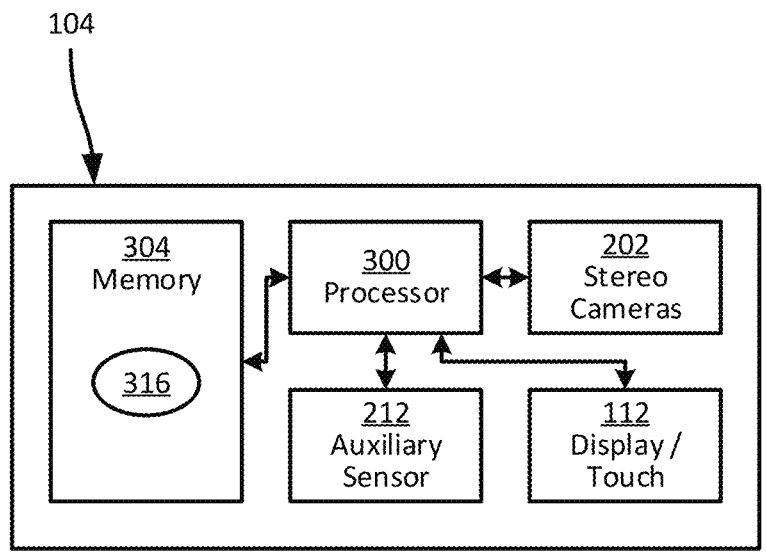
FIG. 3 is a block diagram of certain internal hardware components of the mobile computing device of FIG. 1.

Referring to FIG. 3, a block diagram of certain components of the device 104 is illustrated. In addition to the display (and integrated touch screen, in this example) 112, cameras 202, and auxiliary sensor 212, the device 104 includes a special-purpose controller, such as a processor 300, interconnected with a non-transitory computer readable storage medium, such as a memory 304. The memory 304 may include a combination of volatile memory (e.g. Random Access Memory or RAM) and non-volatile memory (e.g. read only memory or ROM, Electrically Erasable Programmable Read Only Memory or EEPROM, flash memory). The processor 300 and the memory 304 may each comprise one or more integrated circuits.

The memory 304 stores computer readable instructions for execution by the processor 300. In particular, the memory 304 stores a calibration detection application 316, also referred to herein simply as the application 316. The application 316, when executed by the processor 300, configures the processor 300 to control the cameras 202 and the auxiliary sensor 212, to gather data for use in detecting the calibration status of the stereo camera assembly 201.

The processor 300, when so configured by the execution of the application 316, may also be referred to as a controller. Those skilled in the art will appreciate that the functionality implemented by the processor 300 via the execution of the application 316 may also be implemented by one or more specially designed hardware and firmware components, such as FPGAs, ASICs and the like in other embodiments. In some examples, at least some of the functionality described below can be performed by a distinct controller integrated with the cameras 202.

Figure 4:
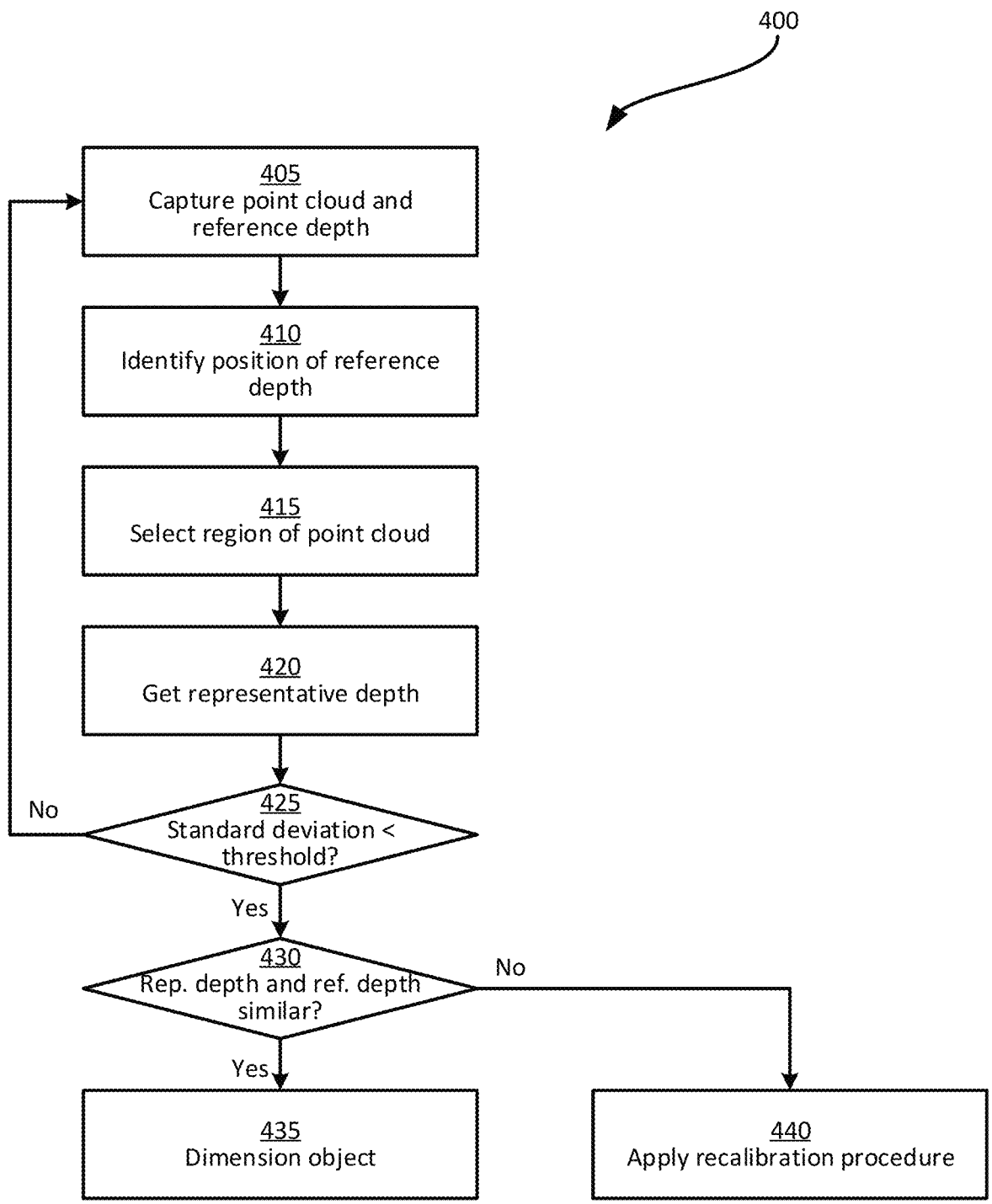
FIG. 4 is a flowchart of a method of detecting calibration of a 3D sensor.

Turning now to FIG. 4, the functionality implemented by the device 104 will be discussed in greater detail. FIG. 4 illustrates a method 400 for detecting the calibration status of a 3D sensor, such as the stereo camera assembly 201. The method 400 will be discussed below in conjunction with its performance by the device 104, via execution of the application 316. In other examples, the method 400 may be performed by other suitable devices or systems.

At block 405, the processor 300 controls the stereo camera assembly 201 and the auxiliary sensor 212 to capture point cloud data and a reference depth measurement, respectively. For example, block 405 may be initiated during a dimensioning operation to dimension the object 108 in the FOV 204 of the device 104. The dimensioning operation may be triggered based on input from an operator of the device 104. Thus, to perform the dimensioning operation, the processor 300 may control the stereo camera assembly 201 to capture the point cloud data representing the object 108 and its surrounding environment. While capturing the point cloud data, the processor 300 may also control the auxiliary sensor 212 to capture the reference depth measurement for use in verifying that the stereo camera assembly 201 is properly calibrated prior to analyzing the point cloud data to determine the dimensions of the object 108. When the device 104 is a mobile device, the processor 300 may control the stereo camera assembly 201 and the auxiliary sensor 212 to simultaneously capture the point cloud data and the reference depth measurement, respectively, to ensure that depth values from the stereo camera assembly 201 and the auxiliary sensor 212 can be accurately compared.

In other examples, the method 400 may be triggered independently of a dimensioning operation, for example upon request from a user, at predetermined intervals of use of the device 104, or the like.

At block 410, the processor 300 identifies the position of the reference depth measurement within the FOV 204 of the stereo camera assembly 201. In some examples, the position of the reference depth measurement may be a pre-stored position (e.g., stored in the memory 304 of the device 104) based on a factory calibration of the auxiliary sensor 212 and the stereo camera assembly 201. In such examples, the processor 300 may simply retrieve the pre-stored position from the memory 304.

In other examples, the position of the reference depth measurement may be dynamically determined based on the captured data. For example, if the auxiliary sensor 212 employs a visible light laser (e.g., red or green light), the processor 300 may use one or both of the images captured by the cameras 202 (i.e., the images used to generate the point cloud data) and apply one or more image processing techniques to identify the position of the reference depth measurement.

Figure 5:
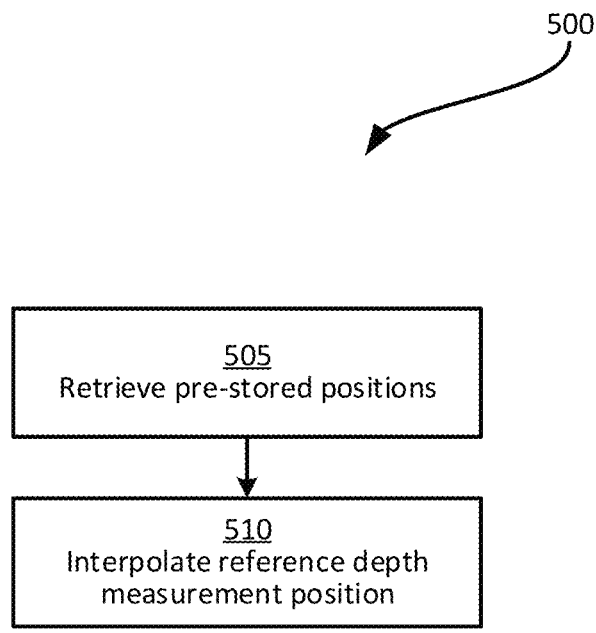
FIG. 5 is a flowchart of a method of identifying a position of a reference depth measurement at block 410 of the method of FIG. 4.

In still further examples, the processor 300 may use the value of the reference depth measurement itself to determine the position of the reference depth measurement based on pre-stored, factory-calibrated depths and positions. For example, referring to FIG. 5, an example method 500 of identifying the position of the reference depth measurement is depicted.

At block 505, the processor 300 retrieves pre-stored first and second positions corresponding, respectively, to first and second baseline distances from the auxiliary sensor 212. That is, the pre-stored first and second positions represent positions of a light source of the auxiliary sensor 212 when it is aimed at surfaces which are located, respectively, at the first baseline distance and the second baseline distance.

Figure 6:
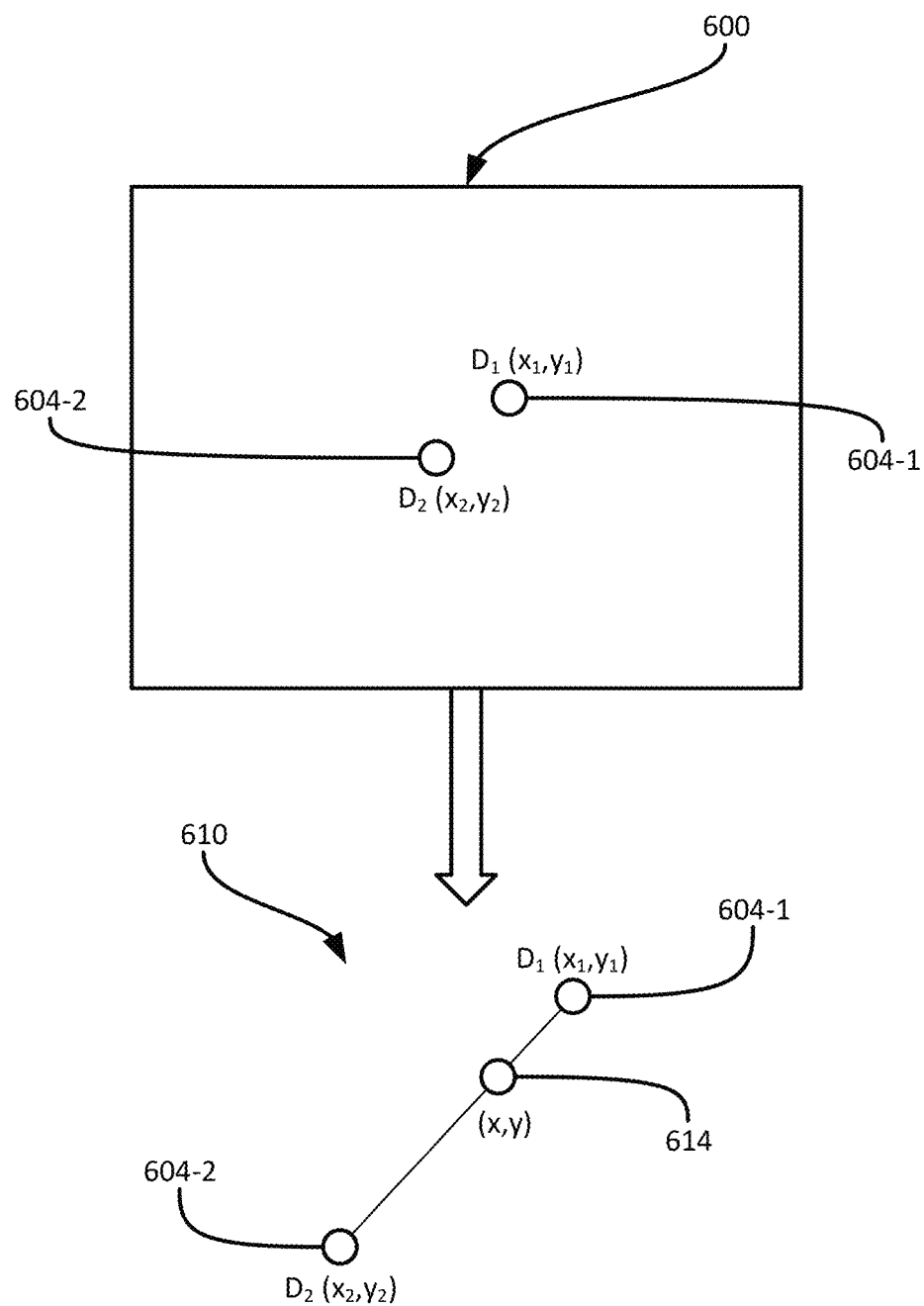
FIG. 6 is a schematic diagram illustrating a performance of the method of FIG. 5.

For example, referring to FIG. 6, an example field of view 600 of the stereo camera assembly 201 is depicted. The field of view 600 includes a first pre-stored position 604-1, having coordinates $(x_1, y_1)$ and a second pre-stored position 604-2, having coordinates $(x_2, y_2)$. The first pre-stored position 604-1 represents the position $(x_1, y_1)$ within the field of view 600 at which the light emitted from the auxiliary sensor 212 appears when the auxiliary sensor 212 is directed at a surface which is a distance $D_1$ away. The second pre-stored position 604-2 represents the position $(x_2, y_2)$ within the field of view 600 at which the light emitted from the auxiliary sensor 212 appears when the auxiliary sensor 212 is directed at a surface which is a distance $D_2$ away.

In other words, the auxiliary sensor 212 emits a light, such as a laser beam towards a surface and uses the time-of-flight to determine the distance of the surface. When the surface is the distance $D_1$ away from the auxiliary sensor 212, the laser beam will appear on the surface at the position 604-1. The position 604-1 has coordinates $(x_1, y_1)$ relative to the frame of view 600 of the stereo camera assembly 201. Similarly, when the surface is the distance $D_2$ away from the auxiliary sensor 212, the laser beam will appear on the surface at the position 604-2, which may differ from the position 604-1 based on variances of the angles and/or positioning of the auxiliary sensor 212 on the device 104. The position 604-2 has coordinates $(x_2, y_2)$ relative to the frame of view 600 of the stereo camera assembly 201.

The distances $D_1$ and $D_2$ may be selected as relatively near and far distances (e.g., as selected based on the expected detection ranges for the device 104), for example 0.5 m and 5 m, in order to sufficiently determine a spread of the positions 604-1 and 604-2. The positions 604-1, and 604-2 associated with the distances $D_1$ and $D_2$ may be determined, for example during factory calibration of the device 104, and then recorded and stored in the memory 304 of the device 104 for use in computation of the location of a reference depth measurement.

Returning to FIG. 5, at block 510, the processor 300 uses the pre-stored positions 604-1 and 604-2 corresponding to distances $D_1$ and $D_2$ and interpolates based on the reference depth measurement to identify the position of the reference depth measurement.

For example, referring again to FIG. 6, a detail view 610 is also depicted. Since the positions 604-1, 604-2 represent the detection positions of the auxiliary sensor at near and far distances $D_1$ and $D_2$, it can be expected that for a reference depth measurement, 614 in between $D_1$ and $D_2$, the position of the reference depth measurement will fall along the line between the positions 604-1 and 604-2. Accordingly, the processor 300 may locate the reference depth measurement 614 at coordinates (x, y) along the line between positions 604-1 and 604-2 based on the relationship between the reference depth measurement 614 and $D_1$ and $D_2$. As will be appreciated, the processor 300 may similarly extrapolate the position of the reference depth measurement by extending the line between the positions 604-1 and 604-2 if the reference depth measurement falls outside the range of $D_1$ and $D_2$.

Returning now to FIG. 4, having identified the position of the reference depth measurement in the FOV 204, at block 415, the processor 300 selects a region of the point cloud data including the position of the reference depth measurement. That is, the position of the reference depth measurement identified at block 410 may still be an estimate and may not be precise, hence the processor 300 may select a larger region of the point cloud data to increase the likelihood that the region includes the position of the reference depth measurement. The region may be, for example, a circle having a predefined radius centered at the identified or assumed position of the reference depth measurement. In other examples, the region may be defined in other shapes and/or need not be centered about the position of the reference depth measurement.

Figure 7:
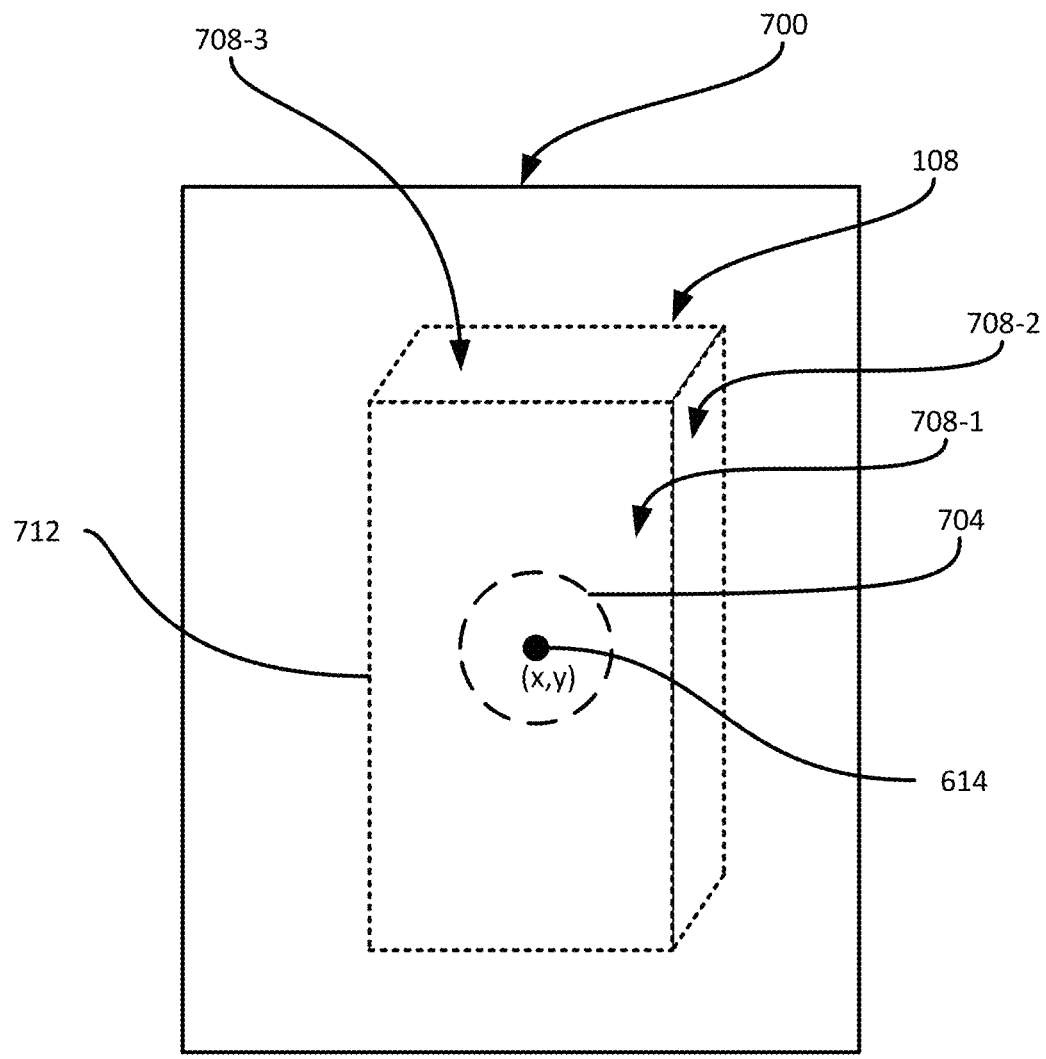
FIG. 7 is a schematic diagram illustrating a point cloud analyzed during the method of FIG. 4.

For example, referring to FIG. 7, an example point cloud 700 is depicted. As can be seen, the point cloud 700 includes a representation of the object 108. The processor 300 may identify, at block 410, for example using the method 500, the position 614 of the reference depth measurement relative to the point cloud 700. Accordingly, at block 415, the processor 300 may select a region 704 including the position 614. In the present example, the region 704 is a circle centered at the position 614.

In some examples, the processor 300 need not identify the location of the reference depth measurement at block 410 and may proceed directly to block 415. In such examples, the processor 300 may make an assumption that the position of the reference depth measurement is approximately centered in the FOV 204 of the stereo camera assembly 201 and may simply select a region about the center of the FOV 204. In such examples, to account for variability in the position of the reference depth measurement, the processor 300 may simply select a larger region (e.g., a circle having a larger predefined radius) than when the location of the reference depth measurement is identified.

Returning to FIG. 4, at block 420, the processor 300 determines a representative depth value for the region selected at block 415. For example, the processor 300 may take the average depth value of each point in the region. In other examples, the processor 300 may select a single point from the region and use its depth as the representative depth value. For example, the processor 300 may select a central point from the region as the representative depth value if a computed standard deviation of the depth values of the points in the region is below a threshold value. In other examples, the processor 300 may apply other suitable computations to select the representative depth value.

At block 425, the processor 300 computes a standard deviation of the depth values of the points within the region of the point cloud data and determines whether the determined standard deviation is below a threshold standard deviation. The standard deviation measures the amount of variation in the depth values of the points within the region, and hence can assist in determining whether the region encompasses a flat surface which is substantially orthogonal to a capture direction of the stereo camera assembly 201, a surface which is slanted relative to the stereo camera assembly 201, or multiple levels of surfaces. In particular, a flat surface which is substantially orthogonal to the stereo camera assembly 201 will generate a relatively low standard deviation, while surfaces which are slanted relative to the stereo camera assembly 201 and/or include multiple levels of surfaces will have higher standard deviations. Since the position of the reference depth measurement may still vary slightly within the region, regions having higher standard deviations may not have a representative depth value which can be accurately compared to the reference depth measurement.

For example, referring again to FIG. 7, the region 704 includes points from the point cloud 700 which lie on a surface 708-1 of the object 108. The surface 708-1 is substantially orthogonal to the capture direction of the stereo camera assembly 201, and hence the standard deviation of points within the region 704 would be low, since the points in the region 704 would have substantially the same depth values. It can therefore be expected that the representative depth value can be accurately compared to the reference depth measurement.

In contrast, if the region 704 included points from the point cloud which lay on surfaces 708-2 or 708-3, which are slanted relative to the stereo camera 201, the standard deviation of the points would be higher, since some points have higher depth values (i.e., are further from the device 104) and some points have lower depth values (i.e., are closer to the device 104). Thus, the representative depth value may or may not correspond accurately to the reference depth measurement since the reference depth measurement may be located anywhere within the region 704, which has varying depth values.

Similarly, if the region 704 was located at an edge 712 of the object 108, the region 704 would include some points from the surface 708-1 and some points from the surrounding environment of the object 108, which may include other objects, the floor and/or walls behind the object 108, or the like. Accordingly, the standard deviation of the points would be higher, since some points have lower depth values (i.e., represent the surface 708-1), while other points have higher depth values (i.e., represent the surrounding environment of the object 108, which are further from the device 104 than the surface 708-1). Thus, the reference depth measurement may be located on the surface 708-1 or on the surrounding environment of the object 108, and hence the representative depth value may not accurately correspond to the reference depth measurement.

Accordingly, returning again to FIG. 4, if the processor 300 determines at block 425 that the standard deviation is above a threshold deviation (i.e., that the surface(s) represented by the region of the point cloud data is not a flat surface which is substantially orthogonal to the stereo camera assembly 201), the processor 300 may discard the point cloud data and the reference depth measurement and return to block 405 to capture new point cloud data and a new reference depth measurement. In some examples, the processor 305 may control the display 112 to present instructions to an operator of the device 104, for example to shift the device 104 and aim the device 104 to approximately center the FOV 204 on a flat, orthogonal surface.

If the processor 300 determines at block 425 that the standard deviation is below the threshold deviation (i.e., that the surface represented by the region of the point cloud is a flat, substantially orthogonal surface), the processor 300 proceeds to block 430. At block 430, the processor 300 determines whether the representative depth value determined at block 420 is within a similarity threshold of the reference depth measurement. For example, the processor 300 may determine whether the representative depth value and the reference depth measurement are within a threshold percentage (e.g., 5%, 10%, 3%, etc.) of one another. In other examples, other similarity conditions may be applied. The processor 300 may then determine, based on whether the representative depth value is within the similarity threshold to the reference depth measurement, whether to use the point cloud data for a dimensioning operation, or whether to discard the point cloud data because the stereo camera assembly 201 is determined to be out of calibration.

If the processor 300 determines at block 430 that the representative depth value is within the similarity threshold to the reference depth measurement, the processor 300 proceeds to block 435. At block 435, the processor 300 analyzes the point cloud data to dimension the object 108 within the FOV 204 of the stereo camera assembly 201. That is, the processor 300 may determine the depth D, the width W and the height H of the object 108. The determined dimensions may be stored in the memory 304, sent to another computing device, such as a remote server or a nearby desktop or laptop computer, or the like, or displayed on the display 112. In other examples, such as when the method 400 is running independently of a dimensioning operation, the processor 300 may simply display at the display 112 a notification that the stereo camera assembly 201 is properly calibrated.

If the processor 300 determines at block 430 that the representative depth value is outside the similarity threshold to the reference depth measurement, the processor 300 proceeds to block 440. At block 440, the processor 300 determines that the stereo camera assembly 201 is out of calibration. The processor 300 may then apply a recalibration procedure to recalibrate the stereo camera assembly 201. The recalibration procedure may be any suitable procedure, for example to determine the relative position of the cameras 202 with respect to one another and to compare their respective FOVs 204 in order to generate point cloud data with accurate depth measurements. In addition to applying the recalibration procedure, the processor 300 may control the display 112 to display a notification that the stereo camera assembly 201 is out of calibration and/or that a recalibration procedure is being applied. The device 104 may thus detect when it is out of calibration, irrespective of a triggering event to cause the device 104 to lose calibration. Additionally, the device 104 may perform the calibration detection as a background process during a dimensioning operation to ensure accurate dimensioning.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A computing device comprising: a three-dimensional (3D) sensor configured to capture point cloud data from a field of view; an auxiliary sensor configured to capture a reference depth measurement corresponding to a surface within the field of view;
   a processor interconnected with the 3D sensor and the auxiliary sensor, the processor configured to: control the 3D sensor and the auxiliary sensor to capture the point cloud data and the reference depth measurement, respectively;
   select a region of the point cloud data including a position of the reference depth measurement, wherein to identify the position of the reference depth measurement, the processor is further configured to: (i) retrieve a first position on the surface corresponding to the auxiliary sensor that is determined by a first distance from the auxiliary sensor to the surface and retrieve a second position on the surface corresponding to the auxiliary sensor that is determined by a second distance from the auxiliary sensor to the surface, and (ii) identify the position of the reference depth measurement of the auxiliary sensor along a line connecting the first position and the second position by interpolation;

determine a representative depth value of the region of the point cloud data to compare to the reference depth measurement; determine whether the representative depth value is within a similarity threshold to the reference depth measurement; and determine, based on whether the representative depth value is within the similarity threshold to the reference depth measurement, whether to use the point cloud data for a dimensioning operation.

2. The computing device of claim 1, wherein
the 3D sensor includes a stereo camera assembly; and wherein the auxiliary sensor includes a range finder.

3. The computing device of claim 1, wherein
the processor is further configured to, when the representative depth value is within the similarity threshold to the reference depth measurement, use the point cloud data to dimension an object within the field of view of the 3D sensor.

4. The computing device of claim 1, wherein
the processor is further configured to, when the representative depth value is outside the similarity threshold to the reference depth measurement, determine that the 3D sensor is out of calibration and apply a recalibration procedure to recalibrate the 3D sensor.

5. The computing device of claim 1, wherein
to select the region, the processor is configured to:
identify the position of the reference depth measurement in the field of view of the 3D sensor; and
define the region as a circle with a predefined radius about the position of the reference depth measurement.

6. The computing device of claim 1, wherein
to determine the representative depth value, the processor is configured to compute an average depth value of points within the region of the point cloud.

7. The computing device of claim 1, wherein
the processor is further configured to:
compute a standard deviation of depth values of points within the region; and
compare the representative depth value to the reference depth measurement when the standard deviation is below a threshold standard deviation.

8. The computing device of claim 1, wherein
the processor is configured to control the 3D sensor and the auxiliary sensor to simultaneously capture the point cloud data and the reference depth measurement, respectively.

9. A method comprising: controlling a 3D sensor and an auxiliary sensor to capture point cloud data and a reference depth measurement, respectively;
selecting a region of the point cloud data including a position of the reference depth measurement by: (i) retrieve a first position on the surface corresponding to the auxiliary sensor that is determined by a first distance from the auxiliary sensor to the surface and retrieve a second position on the surface corresponding to the auxiliary sensor that is determined by a second distance from the auxiliary sensor to the surface, and (ii) identify the position of the reference depth measurement of the auxiliary sensor along a line connecting the first position and the second position by interpolation;

determining a representative depth value of the region of the point cloud data to compare to the reference depth measurement;

determining whether the representative depth value is within a similarity threshold to the reference depth measurement; and determining, based on whether the representative depth value is within the similarity threshold to the reference depth measurement, whether to use the point cloud data for a dimensioning operation.

10. The method of claim 9, further comprising,
when the representative depth value is within the similarity threshold to the reference depth measurement, using the point cloud data to dimension an object within a field of view of the 3D sensor.

11. The method of claim 9, further comprising,
when the representative depth value is outside the similarity threshold to the reference depth measurement, determining that the 3D sensor is out of calibration and applying a recalibration procedure to recalibrate the 3D sensor.

12. The method of claim 9, wherein selecting the region comprises:
identifying the position of the reference depth measurement in a field of view of the 3D sensor; and
defining the region as a circle with a predefined radius about the position of the reference depth measurement.

13. The method of claim 12,
further comprising interpolating the position of the reference depth measurement based on the first and second positions.

14. The method of claim 9, wherein determining the representative depth value comprises computing an average depth value of points within the region of the point cloud.

15. The method of claim 9, further comprising:
computing a standard deviation of depth values of points within the region; and
comparing the representative depth value to the reference depth measurement when the standard deviation is below a threshold standard deviation.

16. The method of claim 9, further comprising
controlling the 3D sensor and the auxiliary sensor to simultaneously capture the point cloud data and the reference depth measurement, respectively.

17. A non-transitory computer-readable medium storing a plurality of computer-readable instructions executable by a processor, wherein execution of the instructions configures the processor to: control a 3D sensor and an auxiliary sensor to capture point cloud data and a reference depth measurement, respectively;
select a region of the point cloud data including a position of the reference depth measurement by: (i) retrieving a first position on the surface corresponding to the auxiliary sensor that is determined by a first distance from the auxiliary sensor to the surface and retrieving a second position on the surface corresponding to the auxiliary sensor that is determined by a second distance from the auxiliary sensor to the surface, and (ii) identifying the position of the reference depth measurement of the auxiliary sensor along a line connecting the first position and the second position by interpolation;
determine a representative depth value of the region of the point cloud data to compare to the reference depth measurement;

determine whether the representative depth value is within a similarity threshold to the reference depth measurement; and determine, based on whether the representative depth value is within the similarity threshold to the reference depth measurement, whether to use the point cloud data for a dimensioning operation.

18. The non-transitory computer-readable medium of claim 17, wherein the 3D sensor includes a stereo camera assembly; and wherein the auxiliary sensor includes a range finder.

19. The non-transitory computer-readable medium of claim 17, wherein the instructions further configure the processor to, when the representative depth value is within the similarity threshold to the reference depth measurement, use the point cloud data to dimension an object within a field of view of the 3D sensor.

20. The non-transitory computer-readable medium of claim 17, wherein the instructions further configure the processor to, when the representative depth value is outside the similarity threshold to the reference depth measurement, determine that the 3D sensor is out of calibration and apply a recalibration procedure to recalibrate the 3D sensor.

21. The non-transitory computer-readable medium of claim 17, wherein to select the region, the instructions configure the processor to:

identify the position of the reference depth measurement in a field of view of the 3D sensor; and define the region as a circle with a predefined radius about the position of the reference depth measurement.

22. The non-transitory computer-readable medium of claim 17, wherein to determine the representative depth value, the instructions configure the processor to compute an average depth value of points within the region of the point cloud.

23. The non-transitory computer-readable medium of claim 17, wherein the instructions further configure the processor to:

compute a standard deviation of depth values of points within the region; and compare the representative depth value to the reference depth measurement when the standard deviation is below a threshold standard deviation.

24. The non-transitory computer-readable medium of claim 17, wherein the instructions configure the processor to control the 3D sensor and the auxiliary sensor to simultaneously capture the point cloud data and the reference depth measurement.

* * * * *